United States Patent
Greger et al.

[15] 3,657,606
[45] Apr. 18, 1972

[54] BUS DUCT PLUG-IN UNIT WITH IMPROVED INTERLOCK

[72] Inventors: George Greger; James J. Rusenko, both of Milwaukee, Wis.

[73] Assignee: Cutler-Hammer, Inc., Milwaukee, Wis.

[22] Filed: Mar. 25, 1971

[21] Appl. No.: 128,002

[52] U.S. Cl. ......................317/112, 339/22 B, 200/50 A, 317/119
[51] Int. Cl. .....................................H02b 1/08, H02b 11/04
[58] Field of Search ............... 317/112, 119; 200/50 A, 50 C; 339/22 B, 75 M

[56] References Cited

UNITED STATES PATENTS

| | | | |
|---|---|---|---|
| 2,088,105 | 7/1937 | Frank et al. | 317/120 |
| 2,883,637 | 4/1959 | Born | 339/22 B |
| 2,932,686 | 4/1960 | Herrmann | 339/22 B X |
| 3,122,603 | 2/1964 | Atkinson | 339/22 B X |
| 3,171,908 | 3/1965 | Malota | 200/50 A |
| 3,339,038 | 8/1967 | Jorgensen et al. | 200/50 A |
| 3,517,274 | 6/1970 | Raskhodoff | 317/112 |
| 3,569,906 | 3/1971 | Cohen | 339/75 M |

FOREIGN PATENTS OR APPLICATIONS

| | | | |
|---|---|---|---|
| 259,220 | 1/1965 | Australia | 317/119 |
| 688,151 | 6/1964 | Canada | 317/119 |

Primary Examiner—Lewis H. Myers
Assistant Examiner—Stanley J. Witkowski
Attorney—Hugh R. Rather and William A. Autio

[57] ABSTRACT

A plug-in unit is hooked into notches in the upper flange of a bus duct, plugged into the duct by swinging it down against the side of the duct wherein stab connectors enter a duct opening to engage the bus bars therein, and latched to the side of the duct by spring biased latches which engage the bottom flange of the duct. An interlock between the unit operator and one of the latches blocks movement of that latch wherein it interferes with the bottom flange to prevent plugging in or removal of the unit with the enclosed switch thereof in the "ON" condition. Indicators are provided on the sides of the bus duct to assist in positioning the unit into the notches when the upper flange is not visible.

6 Claims, 8 Drawing Figures

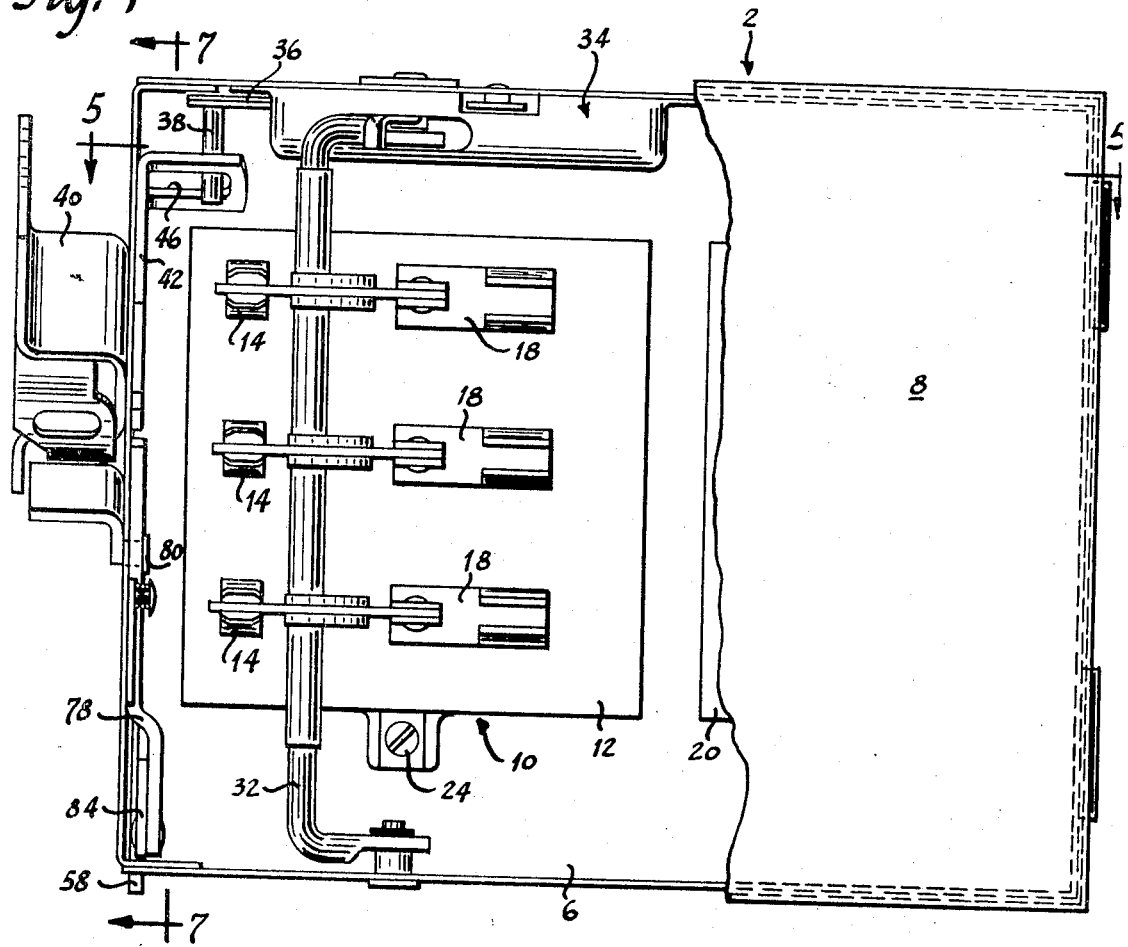
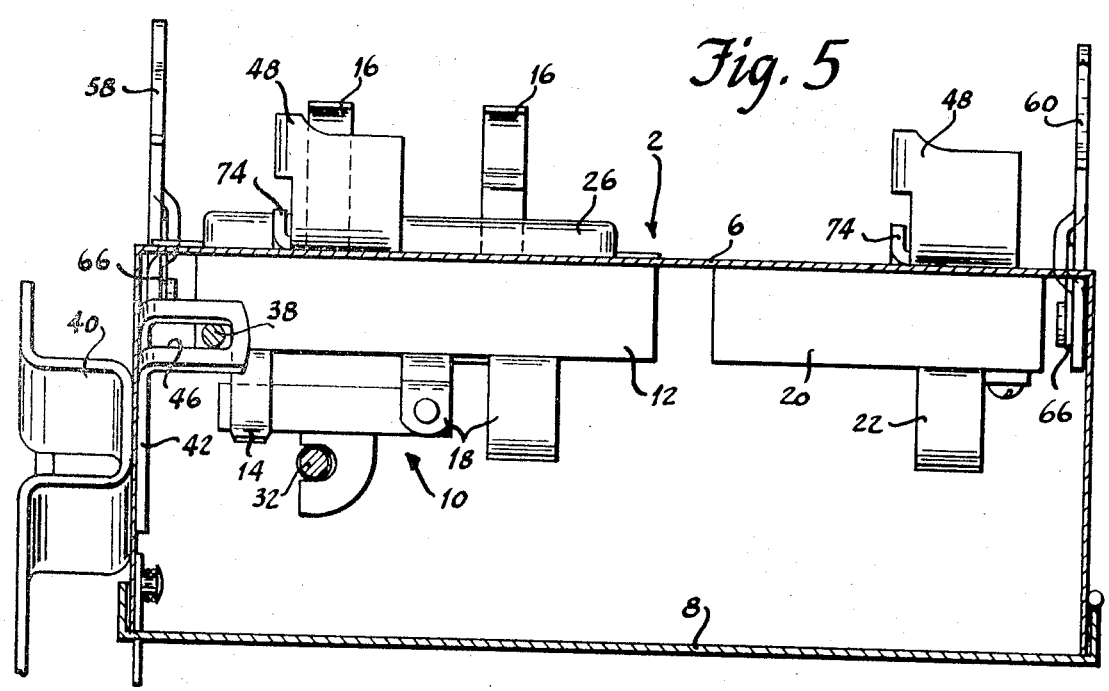

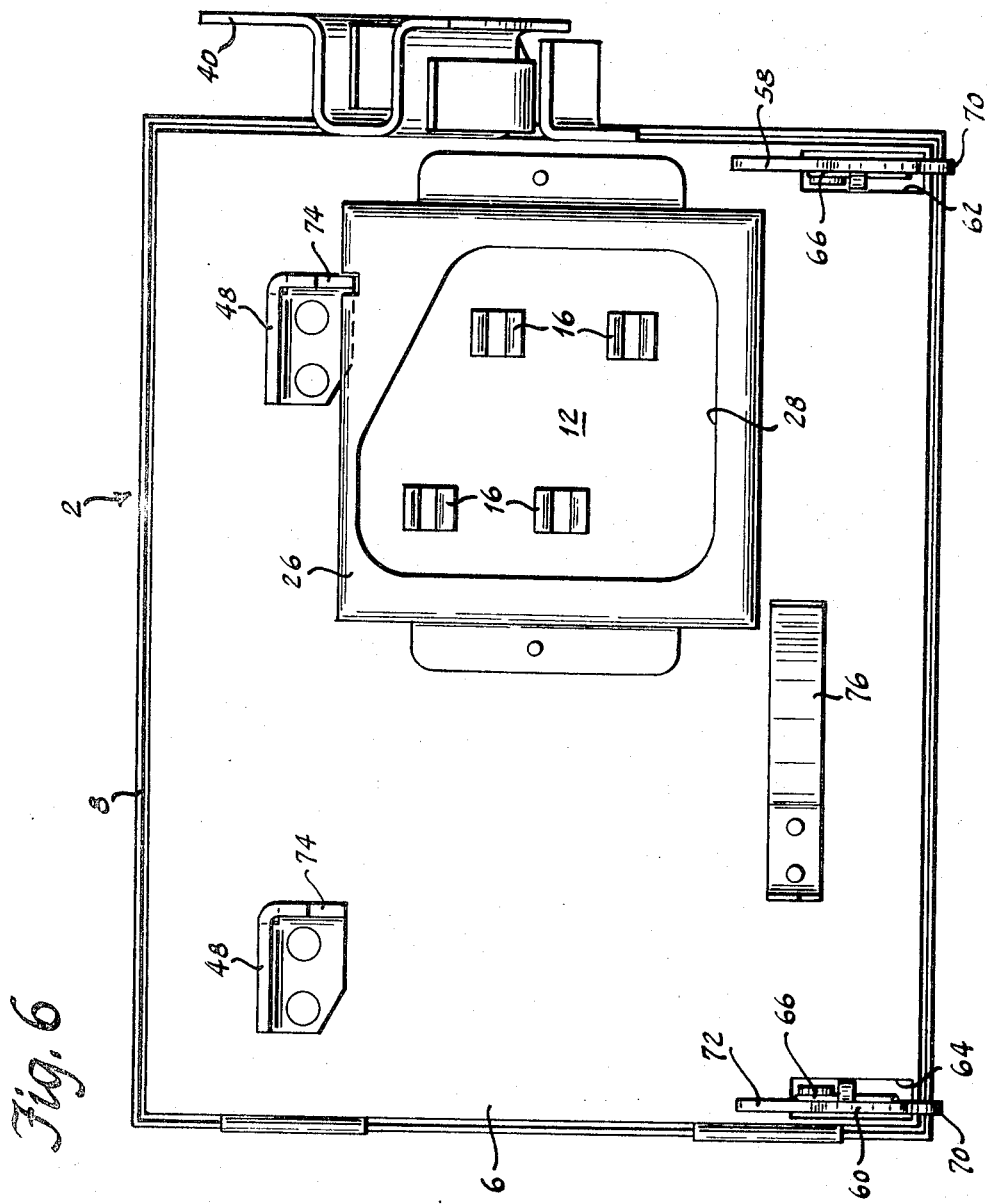

BUS DUCT PLUG-IN UNIT WITH IMPROVED INTERLOCK

BACKGROUND OF THE INVENTION

This invention relates to plug-in units for electrical bus ducts and more particularly to interlock means for preventing plugging-in or removing the unit when the switch thereof is in the "ON" condition.

Plug-in apparatus for tapping electrical power from busway systems have undergone a continuing program to improve the ease and safety with which the apparatus may be mounted and electrically plugged into the bus duct. To eliminate the need to familiarize installation and maintenance personnel with several different attachment instructions and techniques, manufactures of busway equipment find it desirable to standardize on the mounting means and method throughout their entire line. The vast range of physical sizes of the apparatus render such standardization more difficult and in certain instances designs necessary for mounting physically large and cumbersome units are quite superfluous for the smaller units of the line.

In plug-in units of all sizes, it is desirable to have the plug-in contacts be automatically guided onto the respective bus bars without requiring visual or manual alinement on the part of the installer. It is further desirable to have the units be quickly and positively attached without requiring the use of tools which may accidentally gain access to electrically hot parts of the bus duct not normally accessible to the workman. Where connections not requiring the use of tools are employed, some difficulty exists in achieving a mechanically tight connection which will not loosen from vibration. Still another difficulty exists in providing a positive means to prevent attaching or removing a plug-in unit when the enclosed switch apparatus thereof is in the "ON" condition.

SUMMARY OF THE INVENTION

It is therefore a primary object of this invention to provide a bus duct plug-in unit which may be readily mechanically and electrically connected to a bus duct without requiring the use of tools.

It is a further object of this invention to provide a bus duct plug-in unit of the above type which is further provided with an interlock means to positively prevent electrical connection or disconnection of the plug-in unit with the bus duct when the enclosed switch apparatus is in the "ON" condition.

These and other objects and advantages of this invention will become more apparent in the following specification and claims when read in conjunction with the accompanying drawings.

BRIEF DESCRIPTION OF THE DRAWINGS

FIG. 4 is a front view of the plug-in unit having a portion of the cover broken away to show the enclosed switch apparatus;

FIG. 5 is a sectional view of the plug-in unit of this invention taken along the line 5—5 in FIG. 4;

FIG. 6 is an elevational view of the rear of the plug-in unit of this invention;

DESCRIPTION OF THE PREFERRED EMBODIMENT

Figure 1:
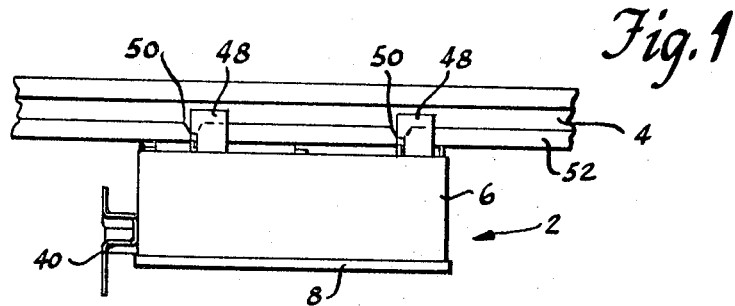
FIG. 1 is a top plan view of the plug-in unit of this invention connected to a segment of bus duct and drawn to a reduced scale.
Figure 2:
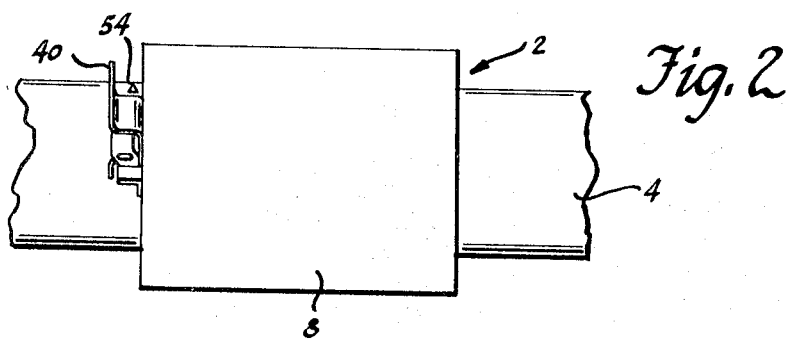
FIG. 2 is a front view of the bus duct and plug-in unit of FIG. 1, also drawn to a reduced scale.

With reference to the drawings, FIG. 1 and 2 thereof show the plug-in unit 2 of this invention attached to a short segment of bus duct 4. FIGS. 3 through 8 are drawn to a substantially greater scale to show the plug-in unit 2 in more detail and it may be seen to comprise a sheet metal box-like housing 6 having an open front closed off by a sheet metal cover 8 hinged to housing 6 at one end wall thereof.

Plug-in units may be employed to house combination motor starters, transformers, molded case circuit breakers or other apparatus as required. The exemplary unit of this application contains a three pole four wire fusible knife switch 10 as shown in FIGS. 4 and 5. Switch 10 is constructed upon an insulating base member 12 which is secured to the rear wall of housing 6 by suitable fastening means (not shown). Each pole of switch 10 includes a stationary contact clip 14 mounted on the front of base 12 and having electrical connection through the base with a respective stab connector 16 mounted on the rear thereof. The individual poles of switch 10 also include combination knife blade and fuse clip assemblies 18. A separate insulating base 20 is provided on the rear wall of housing 6 to the right of base 12 in FIGS. 4 and 5, the base 20 serving to mount three combination fuse clip and load wiring terminal assemblies in cooperating alinement with the respective assemblies 18 on switch 10.

Also provided on the front of base 12 is a wiring terminal 24 for receiving a neutral wire thereon, the terminal 24 having electrical connection through the base 12 to a fourth stab connector 16 mounted on the rear thereof. The rear wall of housing 6 is provided with an opening in the area of insulating base 12, the opening being surrounded with a shield 26 which in turn is provided with an opening 28 through which the stab connectors 16 project (see FIGS. 3 and 6) to attach to bus bars 30 within the bus duct 4.

Each of the knife blade assemblies 18 of fusible switch 10 are provided with a common drive connection to a U-shaped bail member 32 (FIG. 4) pivotally mounted at its ends between the upper and lower walls of housing 6. The upper end of bail member 32 is received within an over-center snap action drive mechanism 34 of a type well known in the enclosed knife switch art and the details thereof have been omitted from this application. A drive arm 36 having a pin 38 depending from its outer end projects out one side of the mechanism 34 to serve as an input lever for the mechanism. Movement of the outer end of drive arm 36 forward and rearward of the housing 6 produces a snap-action drive of the bail 32 across the switch 10 to open and close the switch blades.

External control of the drive mechanism 34 is provided by an operator 40 pivotally mounted on the left-hand end wall of housing 6. A crank arm 42 is secured to the operator 40 for rotation therewith at the interior of housing 6 by screws 44. Crank arm 42 extends toward drive arm 36 and has its outer end formed over at right angles with a slot 46 therein to receive pin 38 of the drive arm 36. Rotational movement of external operator 40 and crank arm 42 drive the outer end of drive arm 36 in the respective forward and rearward directions as aforedescribed to operate the mechanism 34 and actuate the switch 10.

Plug-in unit 2 is provided with a pair of hooks 48 riveted to the rear wall of housing 6. Hooks 48 engage within notches 50 in upper flange 52 of bus duct 4 to attach the plug-in unit 2 to the upper portion of the bus duct. Inasmuch as the top side of the bus duct 4 may not always be visible to the person installing the plug-in unit, triangular cutouts 54 (FIG. 2) are provided in the sidewalls of the bus duct 4 to serve as visual positioning indicators for the unit 2 from the front or underside of the duct. The cutouts 54 are longitudinally located with respect to the notches 50 such that by positioning the left-hand end of housing 6 in alinement with a triangular cutout 54, the hooks 48 will be in alinement with the respective notches 50 in the upper flange 52.

With the hooks 48 engaged within notches 50, the plug-in unit 2 may be swung downward against the side of bus duct 4 to cause the stab contacts 16 to enter the bus duct through an opening 56 in the sidewall thereof to connect with the respective bus bars 30. A pair of spring biased pivotable latches 58 and 60 are provided on the enclosure to secure the unit 2 to the bus duct 4. Latches 58 and 60 are pivotally mounted on the interior lower portions of the end walls of housing 6 to extend externally thereof through openings 62 and 64, respectively, in the rear wall of the housing. Torsion springs 66 are provided with each latch to bias the external end thereof upwardly to engage the lower flange 68 of bus duct 4 at the rear of that flange to secure the lower portion of unit 2 to the duct.

As can be seen in the drawings, the plug-in unit 2 of this invention may be mechanically and electrically connected to and removed from the bus duct 4 without requiring the use of tools. Each of the latches 58 and 60 are provided with depending finger tab portions 70 at their outer ends to facilitate pulling the latches downward clear of the lower flange 68. Since the size of the unit may lead to some difficulties in a workman reaching both latches at the same time, latch 60 is further provided with a sloped leading edge 72 to engage with the lower flange 68 in attachment to be cammed clear thereof. The latches 58 and 60 move upward under the bias of springs 66 when the unit 2 is in place against the side of duct 4. Firm engagement between hooks 48 and latches 58 and 60 with the respective upper and lower flanges 52 and 68 is maintained by outwardly extending tabs 74 formed on the hooks 48 and a leaf spring 76 riveted to the rear wall of housing 6. Tabs 74 bear against the upper flange 52 of bus duct 4 and spring 76 bears against the lower flange 68 to urge the plug-in unit 2 outwardly of the bus duct.

Figure 3:
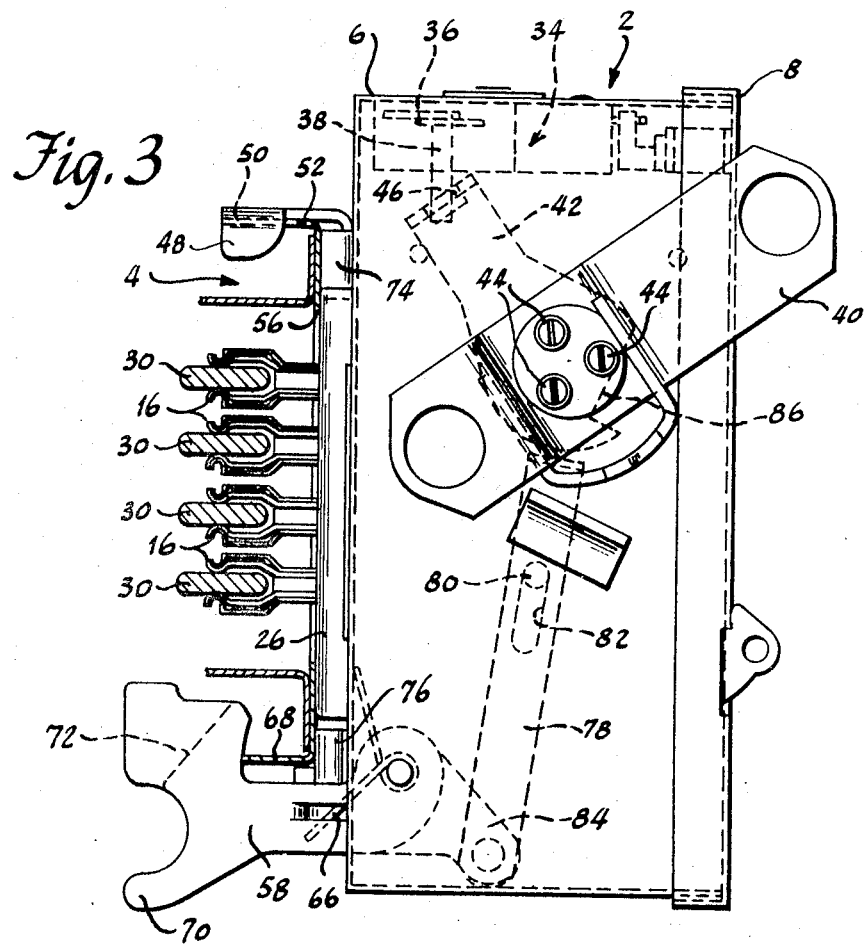
FIG. 3 is an end elevation view of the plug-in unit of this invention shown attached to a fragmentary portion of the bus duct.
Figure 7:
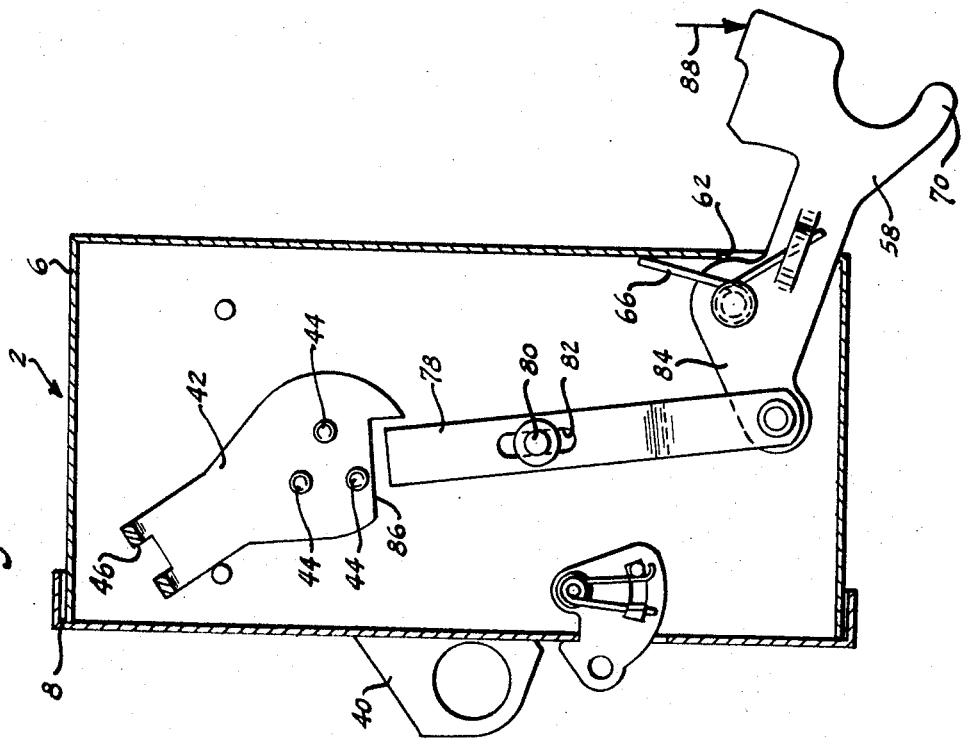
FIG. 7 is a sectional view of the plug-in unit taken along the line 7—7 in FIG. 4 and showing the operating mechanism moved to the "OFF" position.
Figure 8:
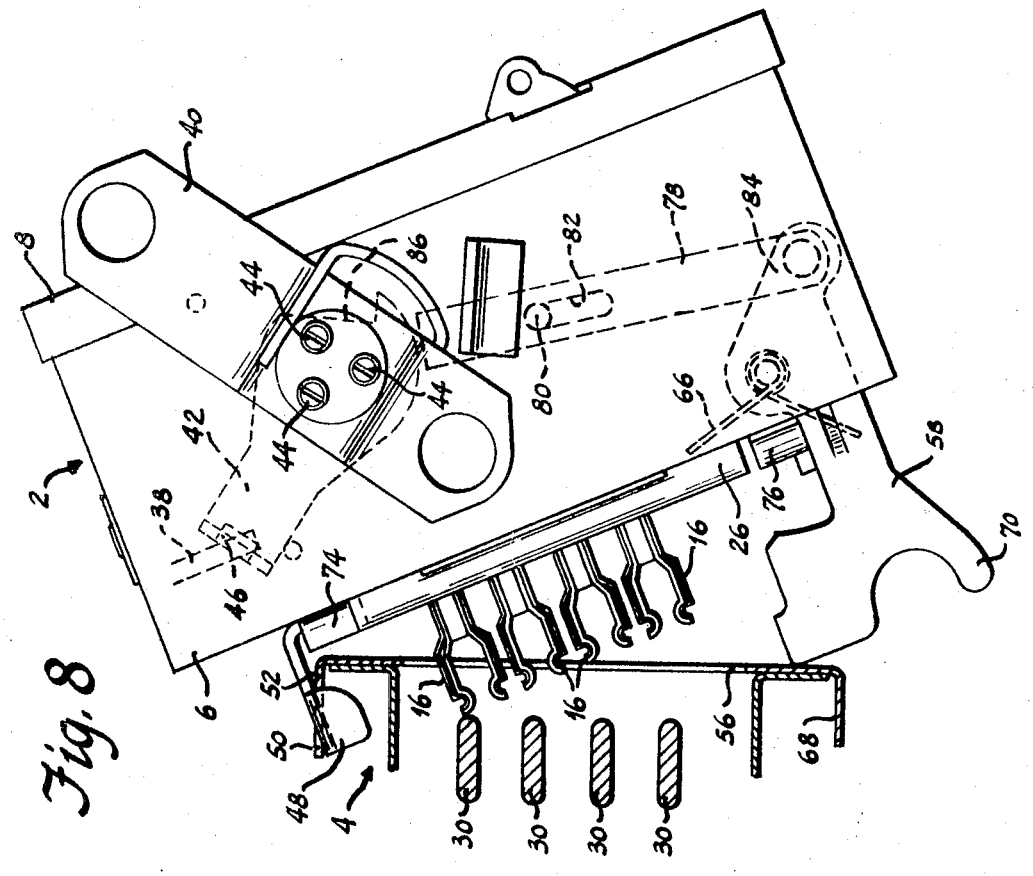
FIG. 8 is an end elevational view similar to FIG. 3 but showing the plug-in unit in a displaced position relative to the bus duct.

An important safety consideration in bus duct plug-in design is to prevent the unit from being plugged in or removed while the switch apparatus enclosed therein is in the "ON" condition. Accordingly the plug-in unit 2 is provided with an interlock 78 attached to the interior of the left-hand end wall of housing 6 by a shouldered rivet 80. The latter extends through an elongated clearance slot 82 in interlock 78 and is riveted to the sidewall to serve as a guide for the interlock 78, the lower end of which is pivotally connected to an inner end extension 84 of latch 58. The upper end of interlock 78 is positioned in close proximity to the hub end of crank arm 42 and the latter is provided with a recessed portion 86. If the external operator 40 is in the "OFF" position, such as in FIG. 7, the interlock 78 may move into the recessed portion 86 in response to downward pivotal movement of latch 58 in response to a force applied thereto in the direction of arrow 88. If the external operator 40 is in the "ON" position such as in FIG. 3 and 8, the upper end of interlock 78 will abut against the hub portion of crank arm 42 to prevent downward pivotal movement of latch 58. If the plug-in unit 2 is thus unattached to the bus duct 4 with the operator 40 in the "ON" position, the latch 58 will abut the lower flange 68 at the side of the duct to prevent the plug-in unit from being swung downwardly against the side and thereby prevent the stab connectors 16 from engaging the bus bars 30 as shown in FIG. 8. If the plug-in unit 2 is already attached to the bus duct 4, the unit cannot be removed therefrom with the operator 40 in the "ON" condition such as is shown in FIG. 3 since the latch 58 cannot be pivoted downward to clear the lower flange 68.

Thus there is described in the foregoing a bus duct plug-in unit which may be readily plugged into a bus duct and secured thereto by spring biased latches, one of which is positively connected and controlled by an interlock member with the operator to absolutely prevent attachment or removal thereof with a bus duct while the enclosed switch apparatus is in the "ON" condition.

We claim:

1. In a plug-in unit for an elongated electrical bus duct having a plurality of longitudinally extending transversely spaced bus bars therein, the combination comprising:

a housing having electrical switch means mounted therein and including a plurality of electrical connector means projecting exteriorly of one side of said housing, said connector means being electrically connected to the contacts of said switch means;

operating means for said switch means including an external operator member pivotally mounted on said housing and movable between first and second positions to operate said switch means between ON and OFF positions, respectively;

hook means on said one side of said housing engaging said bus duct along an edge thereof to pivotally attach said housing to said bus duct for pivotal movement against the side of said bus duct, said electrical connector means entering an opening in the side of said duct and establishing plug-in electrical engagement with the bus bars when said housing is positioned against the side of said bus duct;

latch means pivotally mounted on said housing and spring biased to a first position to abut the side of said bus duct and prevent said housing from being pivoted against the side of said bus duct to thereby prevent said connector means from engaging said bus bars, said latch means being movable against said spring bias to a second position clear of said bus duct to permit said connector means to electrically engage said bus bars, and said latch means being returnable to said first position when said housing is against the side of said bus duct to engage said bus duct along an edge thereof to latch said housing thereto;

interlock means operatively associated with said latch means and movable in response to movement of said latch means; and means on said operating means for blocking movement of said interlock means when said operator member is in said first position to prevent said latch means from being moved to said second position.

2. The combination according to claim 1 wherein said interlock means comprises and elongated member pivotally connected connected to said latch means at one end and guided for substantially longitudinal movement toward and away from said operating means.

3. The combination according to claim 2 wherein said operating means includes a crank arm disposed inside said housing and connected for direct rotational movement with said operator member and said means for blocking movement of said interlock means comprises a flange segment on said crank arm substantially concentric with the rotational axis thereof, the free end of said interlock member being disposed in close proximity to said flange.

4. The combination according to claim 3 together with a recessed portion formed in said flange, said portion being in alinement with the free end of said interlock member when said operator member is in said second position to permit said interlock member to move into said recessed portion, thereby permitting movement of said latch means to said position thereof.

5. The combination according to claim 1 wherein said latch means is mounted to said housing at one end thereof and a second, substantially similar spring biased latch means is pivotally mounted to said housing at an opposite end thereof, said second latch means being independent of said interlock means and having an angularly formed leading surface engaging with said bus duct upon pivotal movement of said housing thereagainst to cam said second latch means to the second position thereof clear of said bus duct, said second latch means being returnable to the first position thereof when said housing is against the side of said bus duct to engage the bus duct along a lower edge thereof to latch said housing to said bus duct.

6. The combination according to claim 1 together with indicator means on the side of said bus duct wherein one end of said housing is alined with said indicator means to establish correct engagement of said hook means with said bus duct.

* * * * *